United States Patent

Uphaus et al.

Patent Number: 5,481,937
Date of Patent: Jan. 9, 1996

[54] TELESCOPIC STEERING COLUMN FOR MOTOR VEHICLES

[75] Inventors: Ludger Uphaus, Neuenkirchen; Rainer Schmidt, Diepholz; Burkhard Schäfer, Stuhr-Seckenhausen, all of Germany

[73] Assignee: Lemförder Metallwaren AG, Lemford, Germany

[21] Appl. No.: 340,271

[22] Filed: Nov. 15, 1994

[30] Foreign Application Priority Data

Nov. 27, 1993 [DE] Germany ............... 43 40 429.4

[51] Int. Cl.⁶ ..................................... B62D 1/18
[52] U.S. Cl. .................. 74/493; 180/78; 280/775
[58] Field of Search ............... 74/493, 492; 280/775; 180/78; 464/179, 172, 171, 181, 182

[56] References Cited

U.S. PATENT DOCUMENTS

| 2,937,881 | 5/1960 | Norrie | 74/493 X |
| 3,580,101 | 5/1971 | Jorgensen | 74/493 |
| 3,813,961 | 6/1974 | Hug | 74/492 |

*Primary Examiner*—Charles A. Marmor
*Assistant Examiner*—Saul Rodriguez
*Attorney, Agent, or Firm*—McGlew and Tuttle

[57] ABSTRACT

A telescopic steering column for motor vehicles which contains a guide in the intermediate steering shaft to compensate the nonuniformity of the rotary movement. The guide rotates the two shaft parts of the intermediate steering shaft, which are axially displaceable in one another, so that the fork position of the joints changes with the set position of the steering column.

3 Claims, 1 Drawing Sheet

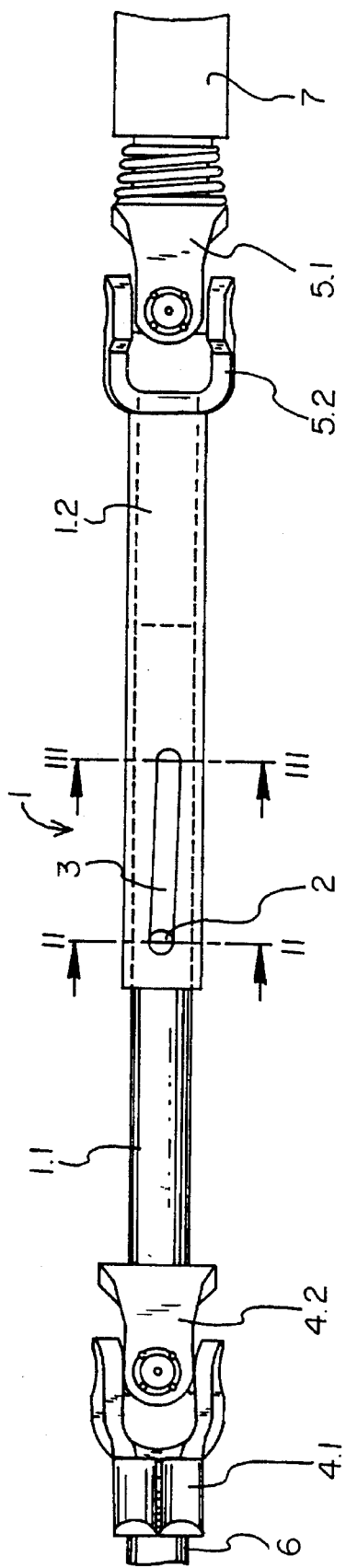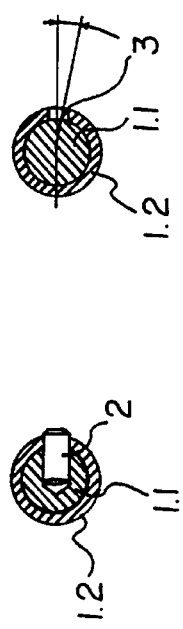

TELESCOPIC STEERING COLUMN FOR MOTOR VEHICLES

FIELD AND BACKGROUND OF THE INVENTION

The present invention describes a telescopic steering column for motor vehicles with an upper steering shaft, which is guided in a steering column jacket and at the end of which the steering wheel is mounted, with a lower steering shaft engaging the steering gear, and with a telescopic intermediate steering shaft, which connects the upper and lower steering shafts to one another via universal joints. In any position of the steering wheel, the individual parts of the steering shaft enclose with one another a three-dimensional bending angle that changes during the telescoping process. Unequal bending angles are known to lead to a nonuniformity between the rotary movement introduced at the steering wheel and the rotary movement that can be determined at the same moment on the steering gear. It is cumulatively composed of the partial nonuniformities in each joint of the steering shafting. If all parts of the steering shaft are in one plane, nononuniformity occurs at equal bending angles.

However, nonuniformities of the rotary movement must always be expected because of unequal bending angles and their arrangement in space. To compensate them, the forks of the universal joints are mounted offset in relation to one another on the intermediate steering shaft. This design ensures optimized uniformity of the rotary movement at least for one position of the steering column. If the steering column is axially displaced from this position, this no longer corresponds to the optimal position. Nonuniformities will again occur in the rotary movement, because the bending angles of the parts of the steering shaft also change with the new adjustment. The steering shaft is also forcibly rotated during the axial adjustment of the steering column, so that it no longer remains in the position for which it was adjusted during straight travel. However, this so-called "neutral position" is desirable for each position of the steering column.

SUMMARY AND OBJECTS OF THE INVENTION

The primary object of the present invention is to develop a steering column for motor vehicles, which makes it possible to extensively compensate the nonuniformity of the rotary movement even in the case of axial adjustment of the steering column.

According to the invention, the telescopic steering column for motor vehicles is provided including an upper steering shaft which is guided in a steering column jacket and which has an end on which a steering wheel is mounted. A lower steering shaft is provided engaging the steering gear. A telescopic intermediate steering shaft is provided which connects the upper and lower steering shafts to one another via universal joints. The individual parts of the steering shaft have, in each position of the steering wheel, a three-dimensional bending angle that changes during the telescoping process. A guide in the intermediate steering shaft causes the two shaft parts to perform a helically movement.

In the steering column according to the present invention, the steering shafting is formed of the three steering shafts, namely, the upper one, to which the steering wheel is attached; the lower one, which is used for connection to the steering gear; and the intermediate steering shaft, which in turn consists of two telescopic shaft parts. The upper steering shaft is mounted in a steering column jacket of the steering column in the known manner. Universal joints are used to establish a connection between the parts of the steering shaft. The guide, which causes the two shaft parts of the intermediate steering shaft to perform a helical movement during the axial adjustment of the steering column, is provided according to the present invention in the intermediate steering shaft. According to the solution proposed, this guide may advantageously consist of a simple pin connection.

An elongated hole, which describes a helical path, is arranged in one shaft part of the intermediate steering shaft. A pin, which is fixed in the other shaft part of the intermediate steering shaft, is guided in this elongated hole. The pin transmits the rotary movement and forcibly causes a relative rotation of the position of the forks relative to one another during the axial adjustment of the steering column by the driver. The advantage of such a guide in the intermediate steering shaft is, according to the present invention, also the fact that the steering wheel remains in the "neutral position" in each position of the steering column, i.e., it is not rotated during the axial movement of the steering column.

The guide may also consist, in a highly advantageous manner, of ball tracks, which are recessed in the shaft parts of the intermediate steering shaft. Balls are guided in these tracks. The fact that the balls additionally support the axial adjustment of the steering column due to their low friction must be considered to be an advantage of such a solution.

Other embodiments of the intermediate steering shaft are also possible according to the present invention. Thus, the sliding connection between the two shaft parts may consist of complementary contours, which bring the intermediate steering shaft into the prescribed helical path. In the simplest case, this may be a spline shaft connection rotated around the common axial center line of the shaft parts. The contour introduced now consists of the toothed segments in the first shaft part and the guides accommodating it in the second shaft part.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a side view of the intermediate steering shaft with a pin connection,

FIG. 2 is a sectional view taken along line II—II in FIG. 1, and

FIG. 3 is a sectional view taken along line III—III in FIG. 2.

DETAILED DESCRIPTION OF THE PREFERRED EMBODIMENT

FIG. 1 shows a steering shafting of a steering column, which comprises a lower steering shaft 6, an upper steering shaft 7, and an intermediate steering shaft 1. The lower steering shaft 6 is used for connection to the steering gear. The steering wheel is mounted at the outer end of the upper steering shaft 7. The upper steering shaft 7 is mounted in a steering column jacket in the known manner. Universal joints are used to connect the individual shafts parts 6, 1 and 7 to one another. The forks 4.2 and 5.2 of the intermediate steering shaft are mounted rotated around their common center line, which is also the center line of the intermediate steering shaft, in relation to one another.

The nonuniformity of the rotary movement can be compensated for at least one position of the steering column due to this rotation. Calculation formulas, which are not the object of the present invention, have been known for determining the angle by which the forks are offset in relation to one another.

The intermediate steering shaft 1 is composed of a first shaft part 1.1 and a second shaft part 1.2. In the embodiment shown, the second, hollow cylindrical shaft part 1.2 is used to axially displaceably accommodate the first shaft part 1.1. As was described above, the nonuniformity of the rotary movement can be compensated in a relatively simple manner by the rotation of the forks at the intermediate steering shaft for one position of the steering column. To achieve this for all settings of an axially adjustable steering column, a guide, which forces the shaft parts 1.1 and 1.2 of the intermediate steering shaft into a helical path during the axial adjustment of the steering column, is provided according to the present invention within the intermediate steering shaft. Rotation of the forks 4.2 and 5.2 in relation to one another is achieved as a result. This rotation corresponds to optimization in each set position of the steering column. The guide shown comprises a helically winding elongated hole 3 in the second shaft part 1.2, which is used to guide a pin 2. The pin 2 is fixed in the first shaft part 1.1, and it also transmits the rotary movement of the steering shaft. The two shaft parts of the intermediate steering shaft are slidingly guided in one another.

FIG. 2 shows the section II—II in FIG. 1. This section shows the connection of the two shaft parts 1.1 and 1.2 of the intermediate steering shaft by means of a the pin 2, which is fixed in the first shaft part 1.1 in the known manner. The pin 2 is guided in a the elongated hole 3 within the second shaft part 1.2.

FIG. 3 shows the shaft parts 1.1 and 1.2 of the intermediate steering shaft, which are slidingly guided in one another. The elongated hole 3 is used to guide the pin.

While a specific embodiment of the invention has been shown and described in detail to illustrate the application of the principles of the invention, it will be understood that the invention may be embodied otherwise without departing from such principles.

What is claimed is:

1. A telescopic steering column for motor vehicles, comprising:

an upper steering shaft guided in a steering column jacket, said upper steering shaft having an end with a steering wheel mounted thereon;

a lower steering shaft engaging a steering gear of the motor vehicle;

a telescopic intermediate steering shaft including a first shaft part and a second shaft part, said intermediate steering shaft being connected to said upper steering shaft and said lower steering shaft via a first universal joint and a second universal joint, respectively, wherein said first shaft part and said second shaft part have, in each position of the steering wheel, a three-dimensional bending angle that changes during a telescoping process; and guide means in said intermediate steering shaft for guiding said two shaft parts along a helical path.

2. Telescopic steering column according to claim 1, wherein said guide means includes a pin connection between said first shaft part and said second shaft part.

3. Telescopic steering column according to claim 2, wherein said pin is fixed in said first shaft part and said second shaft part includes an elongated hole, said pin being guided in said elongated hole.

\* \* \* \* \*